(12) United States Patent
Hickey et al.

(10) Patent No.: US 12,061,575 B2
(45) Date of Patent: Aug. 13, 2024

(54) ADAPTIVE NAMESPACE VERIFICATION FOR CLUSTER FILESYSTEMS

(71) Applicant: Dell Products L.P., Round Rock, TX (US)

(72) Inventors: Charles J. Hickey, Aptos, CA (US); Shashikanth Lakshmikantha, San Jose, CA (US); Murthy V. Mamidi, Queen Creek, AZ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/958,792

(22) Filed: Oct. 3, 2022

(65) Prior Publication Data

US 2024/0111727 A1    Apr. 4, 2024

(51) Int. Cl.
*G06F 16/17* (2019.01)
*G06F 16/11* (2019.01)

(52) U.S. Cl.
CPC ........ *G06F 16/1734* (2019.01); *G06F 16/128* (2019.01)

(58) Field of Classification Search
CPC .......................... G06F 16/1734; G06F 16/128
See application file for complete search history.

(56) References Cited

U.S. PATENT DOCUMENTS

2013/0275695 A1\* 10/2013 Ponsford ............. G06F 11/1456
                                                     711/E12.103
2016/0154794 A1\* 6/2016 Knapp ................ G06F 11/1446
                                                     709/219

\* cited by examiner

*Primary Examiner* — Cam Y T Truong
(74) *Attorney, Agent, or Firm* — Staniford Tomita LLP

(57) ABSTRACT

Embodiments for providing adaptive namespace verification with high efficiency. The verification process is used in modern filesystems to check the integrity of key data structures, such for backup systems where providing thorough and efficient mechanisms for verification is critical. Embodiments accelerate the verification process by selectively applying continuous, differential, and integral verification techniques for startup and runtime repair purposes to overcome present problems for system capacities that exceed the petabyte range and impose significant time requirements using existing verification methods. Embodiments work with both single-node and distributed filesystems.

20 Claims, 17 Drawing Sheets

| DIRECTORY CHECKSUM | FILE CHECKSUM |
|---|---|
| Flags & Version | Flags & Version |
| Count of Files | Count of Files |
| File IDs (XOR of all) | Content Handle (XOR of all) |
| Adler | Adler |

| Type | Lag | Mode | Benefit | Data | Checks |||||
|---|---|---|---|---|---|---|---|---|---|
| | | | | | Age | Stamp | Inode | Index | Directory | Global | File |
| Continuous | Minutes | Distributed | Quick | Fresh | X | X | X | | | | |
| Differential | Hours | Distributed | Efficient | Newer | | X | X | X | X | | |
| Integral | Days | Single Node | Thorough | All | | X | X | X | X | X | X |

ADAPTIVE NAMESPACE VERIFICATION FOR CLUSTER FILESYSTEMS

CROSS-REFERENCE TO RELATED APPLICATIONS

The present application is related to the following U.S. patent application Ser. Nos. 17/958,751 filed on Oct. 3, 2022 and entitled "Continuous Namespace Verification for Single-Node Filesystems,"17/958,862, filed on Oct. 3, 2022 and entitled "Adaptive Namespace Verification for Single-Node Filesystems," and 17,958,912, filed on Oct. 3, 2022 and entitled "Continuous Namespace Verification for Cluster Filesystems," which are each assigned to the assignee of the present application.

TECHNICAL FIELD

Embodiments are generally directed to data integrity checks, and specifically to efficiently checking the integrity of key data structures in single-node and cluster filesystems.

BACKGROUND

Most modern filesystems provide methods to check the integrity of their key data structures. For filesystems where data integrity is paramount, such as those used for backup, providing thorough and efficient mechanisms for verification is critical, especially in the case where a system crash occurred or similar significant event. The problem is that as capacities move well into the petabyte range, the time required for verifying a filesystem namespace can take a significant amount of time, such as on the order of many hours.

Present filesystems typically provide some form of data verification method or service, such as filesystem check (FSCK) in UNIX-based systems, and check disk (chkdsk) on Windows systems. These are typically run after a crash as a special operation, or when the filesystem is offline. Given that the newer types of log-structured filesystems have improved crash resilience, startup checking has been replaced in some implementations with deferred verification that executes at runtime. Runtime verification is essentially a "scrubbing" operation whereby metadata that has been written at an earlier point in time is read back into the main memory and checked for correctness. Many portions of the filesystem are examined, with namespace verification being a critical component.

The namespace stores the names of directories and files, and related information (i.e., metadata) that includes file ownership, creation time, and the like. Improving the efficiency of namespace verification can reduce the risk of data loss and speed the task of bringing a damaged filesystem back online. Namespace metadata as a percentage of total data has been observed to remain relatively constant as filesystem capacity increases. This means that the time required to perform verification has increased linearly to the point that it exceeds the allocated amount of time in many systems. As a result user data is at greater risk of loss due to corruption or unavailability due to filesystem downtime. Periodic sweeps of a namespace may not make the best use of available resources.

What is needed, therefore, is a method and system of efficiently providing adaptive namespace verification in a manner that makes best use of available resources to minimize verification time requirements. What is further needed is a namespace verification process that works efficiently for both single-node and distributed filesystem environments.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell, EMC, and Data Domain are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7A is a table that illustrates namespace checksums for a cluster filesystem, under some embodiments.

FIG. 7B is table that lists the different verification methods used by the adaptive verification module for run-time verification, under some embodiments

DETAILED DESCRIPTION

Figure 1:
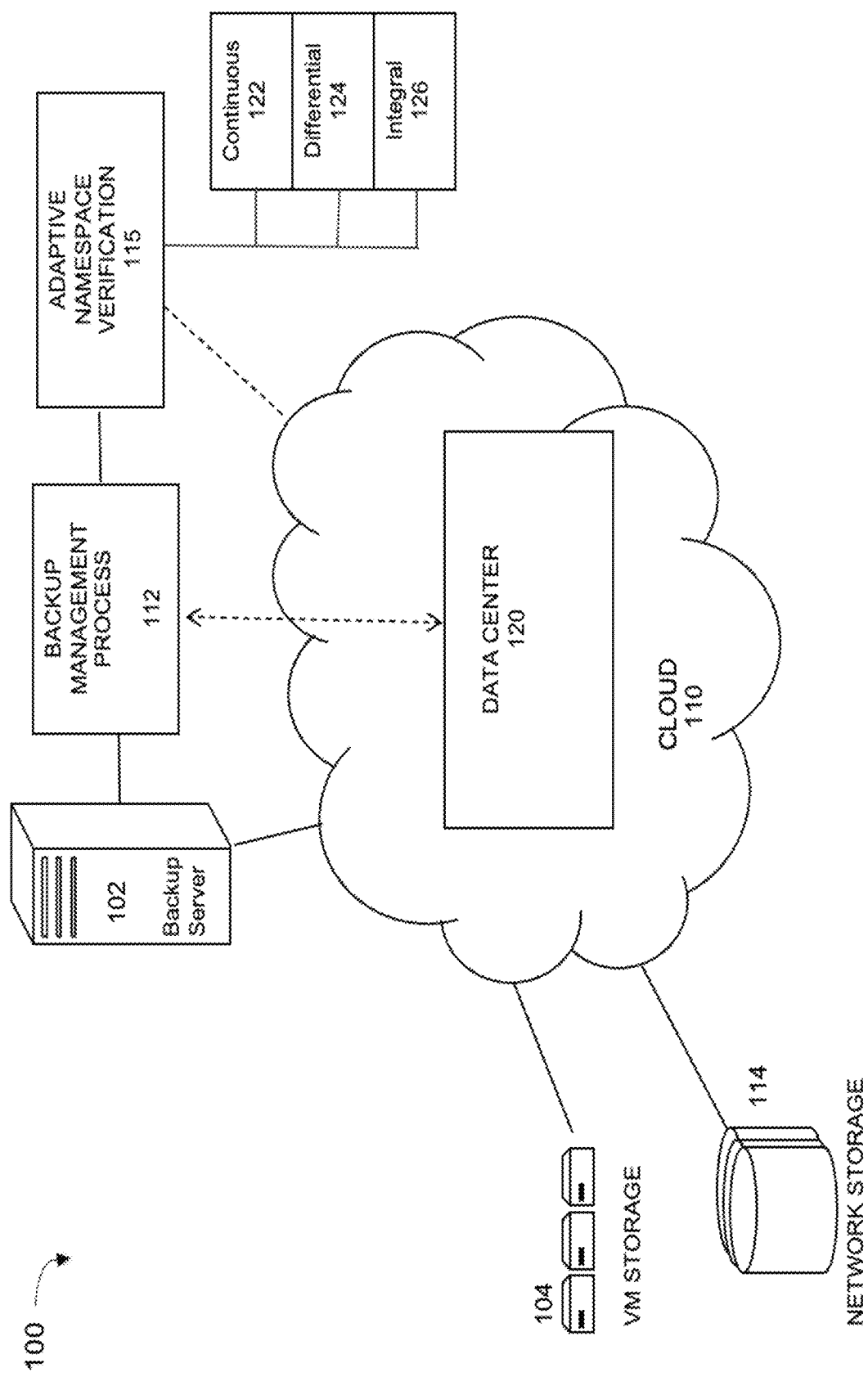
FIG. 1 illustrates a computer network that implements a granular data migration process for a distributed name space, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus, or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

FIG. 1 illustrates a computer network system implements embodiments of an adaptive namespace verification process, under some embodiments. System 100 comprises a large-scale network that includes a number of different devices, such as server or client computers 102, data center 120, storage devices 114, and other similar devices or computing resources. Other networks, sub-networks, and components may be included in system 100 including local area network (LAN) or cloud networks 110 and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a typical data center system under some embodiments, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114. Backup targets or appliances may also be included in a data center 120 hosted in its own network (e.g., cloud) 110. Data center 120 may represent the computing resources running the information technology (IT) system of an organization or enterprise, and which are organized an interconnected in their own network, such as cloud 110. Typical data centers are relatively large-scale facilities that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers, and data are maintained and provided through a centralized cloud computing platform. In an embodiment, parts of system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

As stated above, for the embodiment of system 100, server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single filesystem across all storage to enable ease-of-use and simple management. This single filesystem can be completely or partially exposed as CIFS shares (for Windows), NFS mount points (for Unix/Linux), VTL for open systems and/or through advanced integration with Data Domain Boost (for Dell/EMC Avamar, Dell/EMC Networker, Dell/EMC Greenplum, Veritas NetBackup, Veritas Backup Exec, Oracle RMAN and Quest vRanger, and other similar programs).

In a deduplication backup system utilizing virtual machines (VMs), each VM runs its own file system, such as a Data Domain Restorer (DDR) or Data Domain File System (DDFS) by Dell/EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares.

Embodiments of process 115 apply to namespace operations in single-node and cluster (or distributed) filesystems specific to the Data Domain Filesystem (DDFS), which is generally typical in its logging design and use of B+ trees for namespace access.

Embodiments of process 115 utilize the fact that filesystem degradation has been observed to follow a similar pattern of failure as storage devices, which tend to follow a curve where problems are more common at the beginning and end of a device's life, and. For this failure pattern of filesystem corruption, utilizing the available resources to the intervals where errors are most likely to occur should narrow the window that damaging events go undetected, while improving overall efficiency.

A cluster or distributed filesystem (DFS) or network file system is a file system that allows access to files from multiple hosts through a computer network, thus allowing multiple users on multiple machines to share files and storage resources. Cluster filesystems have the advantage of being able to increase their capacity and capability through the incremental addition of compute and storage resources on a local area network. This is distinct from traditional file systems, such as the Linux EXT3 or Windows NTFS on single-node (or computer) systems that can quickly exhaust that system's compute and storage resources. Practically all filesystems provide some form of verification program (e.g., FSCK on Linux or chkntfs on Windows) to check the consistency of the filesystem (with possible repairs), but these run only when the filesystem is offline. Other filesystems such as Data Domain's DDFS go one step further and provide a continuous or "inline" verification process that runs while the filesystem is in use. Such an inline verification process is able to detect problems before they result in a serious loss or corruption of user data. Either way, single node file systems have a distinct advantage when it comes to verification because all the data they need to examine is in one place.

In an embodiment, and for log structured filesystems (LFS) in both distributed or single-node filesystems, files and directories for each namespace in system 100 are stored in a B+ Tree, or other similar self-balancing tree structure. Associated with the backup management process 112 is an adaptive namespace verification process 115 that may be embodied as a process that is included with or accessible from the backup management server and backup program 112, or as a cloud-based 110 program. Although embodiments are described with reference to B+ Trees, embodiments are not so limited, and other similar data structures or binary trees to B+ Trees may be used, such as AVL trees, LSM trees, and the like. A B+ Tree is a variant of a standard B Tree in which copies of keys are stored in the internal node, the keys and records are stored in leaves, and a leaf node may include a pointer to the next leaf to speed sequential access.

For the file system used in system 100, a binary tree is used to store the namespace of the file system in persistent storage. In general, a B+ tree is a self-balancing tree data structure that maintains sorted data and allows searches, sequential access, insertions, and deletions in logarithmic time. B+ Trees are well suited for block-based storage systems that read and write relatively large blocks of data and are used in filesystems to allow, quick random access to an arbitrary block in a particular file. In a B+ Tree, a search starts from the root and recursively traverses down. For every visited non-leaf node, if the node has the key (k), it simply returns the node. Otherwise, it recurs down to the appropriate child of the node. If it reaches a leaf node and does not find k in the leaf node, it returns a NULL value. A traversal operation starts from the leftmost child, and recursively prints the leftmost child, then repeats the same process for the remaining children and keys until it ultimately recursively prints the rightmost child.

An inode (index node) is a filesystem data structure that describes an object, such as a file or directory. Each inode stores the attributes and disk block locations of the object's data. Filesystem object attributes may include metadata that encodes information such as time of last change, access, modification, owner, permission data, and so on. Directories are lists of names assigned to inodes. A directory contains an entry for itself, its parent, and each of its children.

In systems using B+ Trees, it is necessary to co-locate all the files of a given directory in the same region in the persistent store to support efficient directory listing retrievals. By doing so, the filesystem will be able to retrieve the directory listing of files in a directory by reading as little portion of the storage as possible, while returning the maximum amount of filesystem name space with fastest possible time. One mechanism is to use a B+ Tree key structure composed of the parent directory inode as the primary key and child file inode as the secondary key to construct the full key. By virtue of B+ Tree key properties, all the child file inodes are stored in a cluster in a given storage region, thus allowing the filesystem to retrieve the directory listing of files in a directory by reading as small a storage portion as possible, while returning the maximum amount of filesystem name space with fastest possible time.

Each file inode is thus stored in the B+ Tree as a data blob using the parent directory inode number and the child file inode number as the key. Such a data structure may be denoted: "<parent_inode:child_inode>". This key is used to create a file handle that is exposed to client devices. For data integrity, it is important that file handles remain immutable so that files can always be located during their lifetimes.

For the example embodiment of FIG. 1, the data storage system is a Data Domain system. In the Data Domain Operating System filesystem, protocol-specific namespaces are presented to clients/applications for accessing the logical filesystem layer. The files and directories in each B+ Tree all reference the same pool of unique segments, called a collection, which is made up of log-structured containers that organize the segments on disk to optimize throughput and deduplication effectiveness. Within a Data Domain system, there are several levels of logical data abstraction above the physical disk storage.

Figure 2:
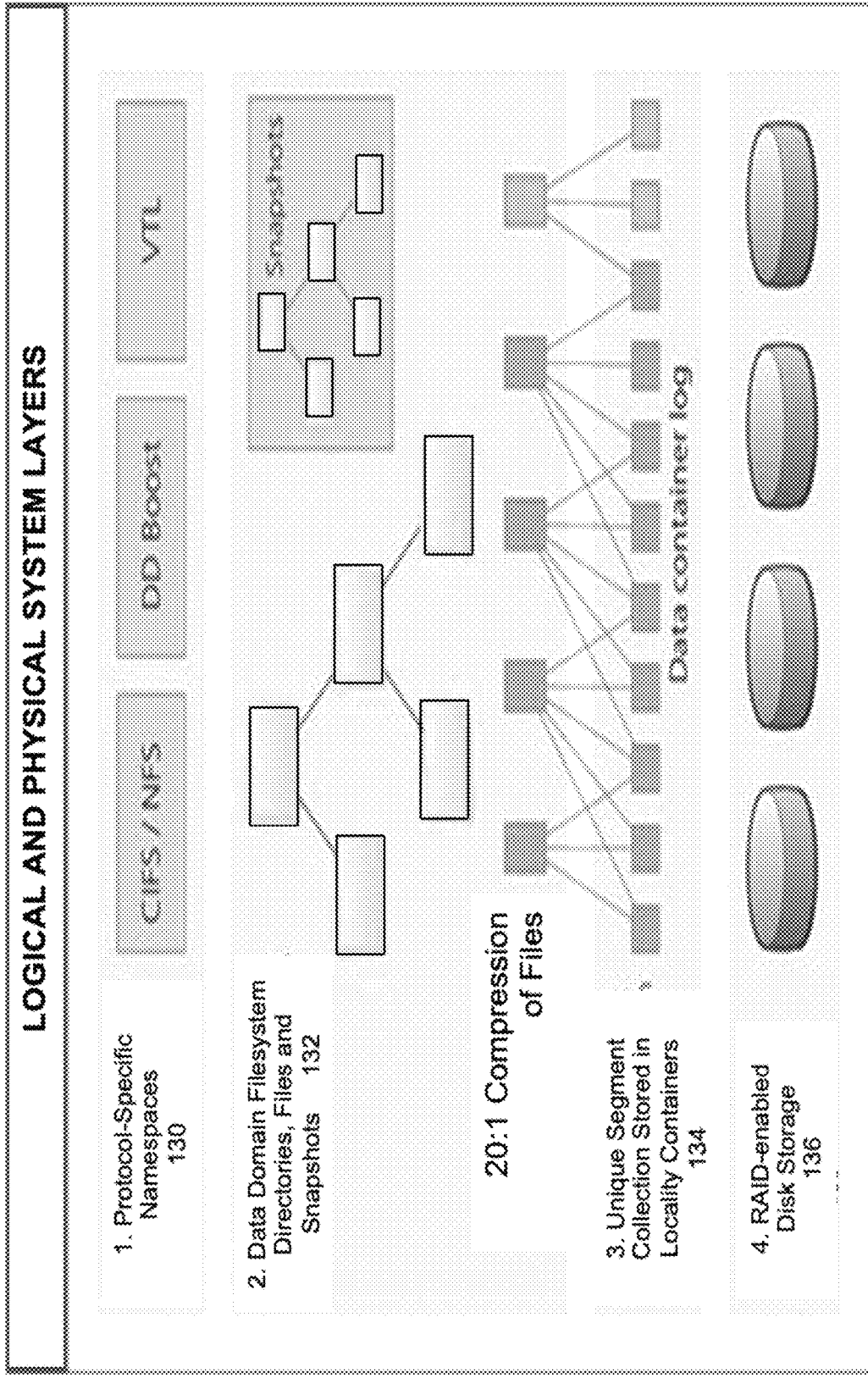
FIG. 2 levels of data abstraction in a Data Domain system including MTrees that implement a granular data migration process, under some embodiments.

FIG. 2 illustrates levels of data abstraction in a Data Domain system including tree-based data structures that implement snapshot backups for an adaptive namespace verification process, under some embodiments. As shown in FIG. 2, the Data Domain Operating System (DDOS) filesystem comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem B+ Trees, directories, files and snapshots layer 132 contain the files and directories for each namespace that are stored in B+ Trees in the DDOS filesystem. The snapshots in DDOS are logical and very space-efficient because they share the same underlying data segments. A unique segment collection 134 is stored in locality containers. The system identifies and eliminates duplicate segments within each container and then writes compressed deduplicated segments to physical disk. The RAID-enabled disk storage layer 136 comprises a collection containers layer over RAID enabled disk drive blocks to ensure data security and integrity.

The Data Domain File System (DDFS) supports manageable file sets called MTrees. In general, an MTree is a tree data structure similar to a B+ Tree (or R-tree), which is constructed using a metric and relies on triangle inequality for efficient range and k-nearest neighbor queries. As with other tree-based data structures, the MTree is composed of nodes and leaves. In each node there is a data object that identifies it uniquely and a pointer to a sub-tree where its children reside. Every leaf has several data objects.

An MTree is a self-contained file set and each MTree acts as a mount point for the file system. DDFS implements the persistence of the name space of an MTree as a serialized B+ Tree. Basically, a typical file can be represented by a set of records. For instance, an inode with its indirect blocks block map can be one record, dirent can be another record, name hash can be yet another record, and extended attributes in others, and so on. As may be known, a dirent is a directory entry storing the name of a corresponding file.

The MTrees supported by DDFS are essentially standalone filesystems in their own right inside a larger filesystem that encloses them. As many as 256 separate MTrees can exist in a given instance of DDFS. An MTree is a set of files in a self-contained file set and each MTree acts as a mount point. MTrees are represented internally as a B+ Tree with three intermediate levels.

In an embodiment, the adaptive namespace verification process 115 performs operations on the MTree's underlying data structure, the B+ Tree. As stated above, a B+ Tree is a balanced tree of fixed depth, and each node in the tree is a fixed size 'page' of 64 KB or similar. Pages refer to each other through a page number, such as 0-8. The physical representation of the tree is a linear area of pages that gets written to disk. The fact that the B+ Tree in flattened form is essentially just a single linearly addressed segment of space means for certain operations it can be traversed quickly.

Figure 3:
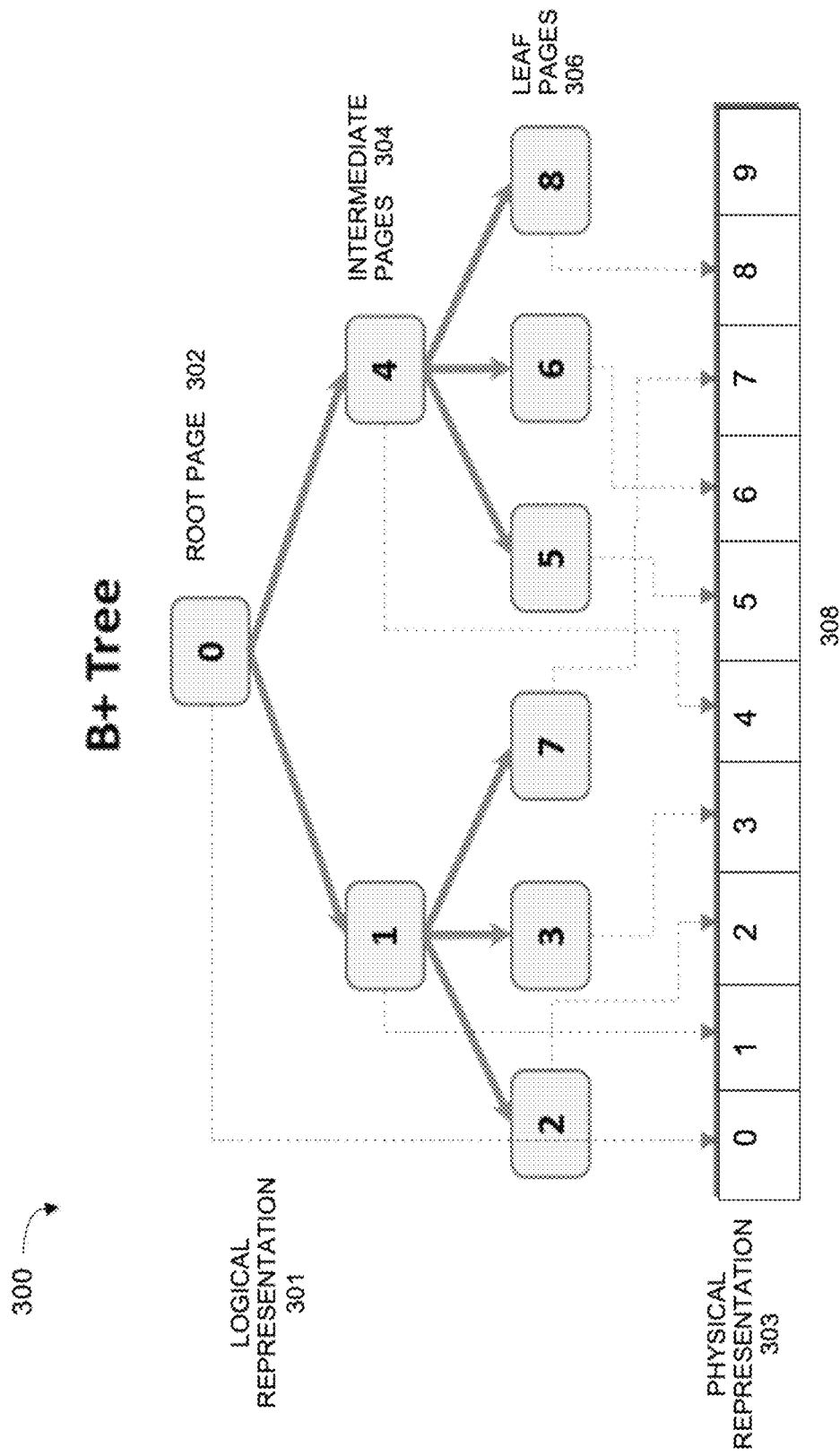
FIG. 3 illustrates an example B+ Tree showing a flattened on-disk layout, under some embodiments.

FIG. 3 illustrates an example B+ Tree showing a flattened on-disk layout, under some embodiments. For simplicity of illustration, the B+ Tree 300 of FIG. 3 is shown with only a single intermediate level, but it should be noted that more than one intermediate (e.g., three levels) are typically included. The example illustrated B+ Tree comprises a root page 302, one or more intermediate pages 304, and leaf pages 306 in a tree-shaped logical representation 301. The on-disk physical representation 303 comprises the nodes of each of these levels as a single one-dimensional array of numbers, 308.

The actual file metadata (i.e., the inode) is contained in the B+ Tree Leaf page 306. The leaf page itself contains key/value pairs as in a manner currently known. The 'key' is 32 bytes in size with the top 16 bytes or a 128-bit number kept in sorted order in the page. It is accompanied by a 'value,' which is actually just an index to data associated with that key, referred to as the 'payload.' The 128-bit key is composed of a 64-bit PID, or parent file ID, and 64-bit CID or child file ID, which is the inode number of the actual file. The B+ Tree then does not contain any file data, just key-value pairs.

The placement of the keys for a file is of particular relevance to the adaptive namespace verification data migration process 115. The CHILD key contains inode type information including the tag, a DIRENT which contains the files name, and two hash keys. The CS_HASH key contains a hash of the file name in a case-sensitive way, and the CI_HASH contains a case-insensitive hash of the same. Given that the tag contained in the CHILD key, and it is encoded pid:cid (parent_ID:child_ID), it can only be involved in filtering the other pid:cid keys since they are nearby. Those keys which are in pid:hash format will be located elsewhere in the B+ Tree for a given file.

When a directory and its files are created in sequence, the keys for those entities line up sequentially in the MTree Leaf page. This means that the lookup proceeds expeditiously since all the data is already in memory.

Figure 4A:
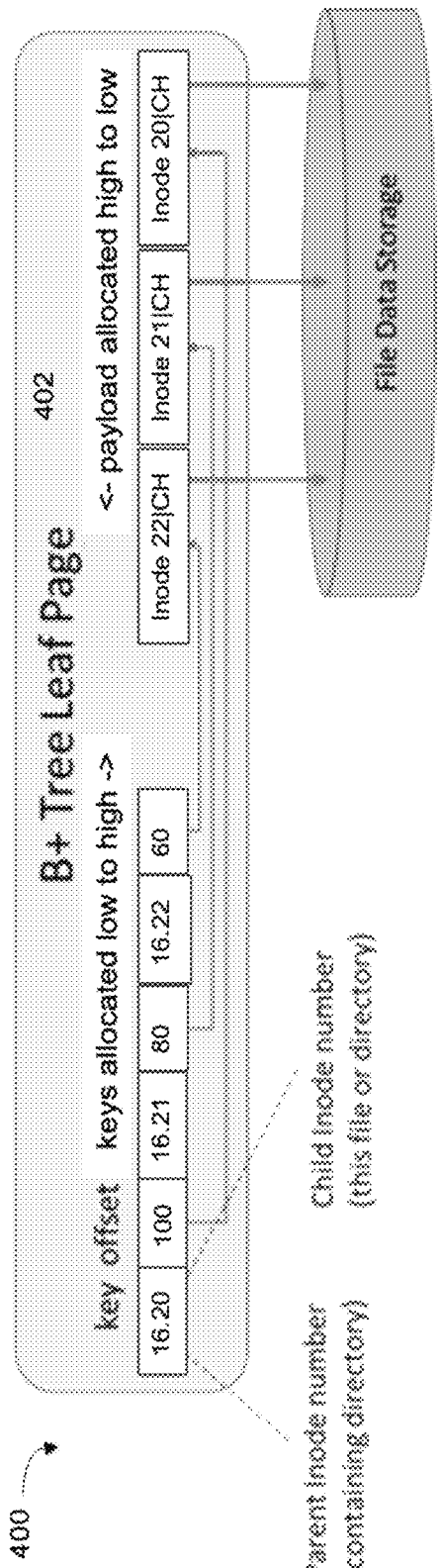
FIG. 4A illustrates a B+ Tree leaf page, under some embodiments.

In DDFS, the blocks in FIG. 3 are referred to as DMBT pages (Directory Manager B+ Tree Pages). FIG. 4A illustrates a B+ Tree leaf page, under some embodiments. As shown in FIG. 4A, in the leaf page or lowest page in the B+ Tree file 402 or directory information is stored as key/value pairs, where the key is of the format (parent-ID: Child-ID), and represents the ID of the directory that the file is in, and the file ID itself, respectively. The value field is additional information relating to the metadata associated with that item, which in the case of a file is the traditional inode information, such as creation time, ownership, file length, and so on.

As mentioned above, DDFS provides supports partitioning into separate file sets referred to as Mtrees, which are mountable portions of the filesystem and can be named by the user, while the system internally uses a unique Mtree ID (MID). Snapshots are similarly identified by both a user-assigned name and an internal Snapshot ID (SID).

Figure 4B:
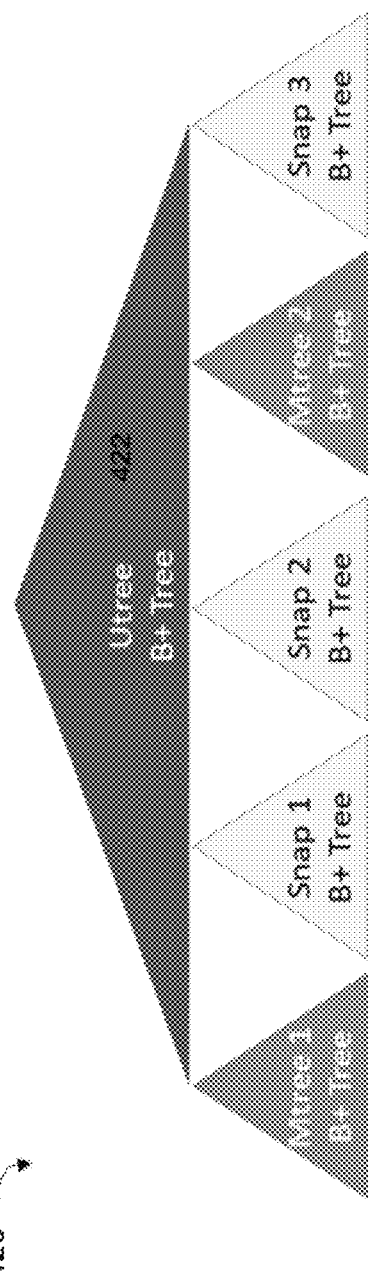
FIG. 4B illustrates a Utree comprised of B+ Trees, under some embodiments.

The directory manager (DM) component of DDFS represents the namespace using B+ Trees. Mtrees and their snapshots are B+ Trees and they, in turn, are referenced from a parent B+ Tree, which is referred to as an umbrella tree or 'Utree,' as shown in FIG. 4B, which illustrates a Utree comprised of B+ Trees, under an embodiment.

Figures 5A, 5B:
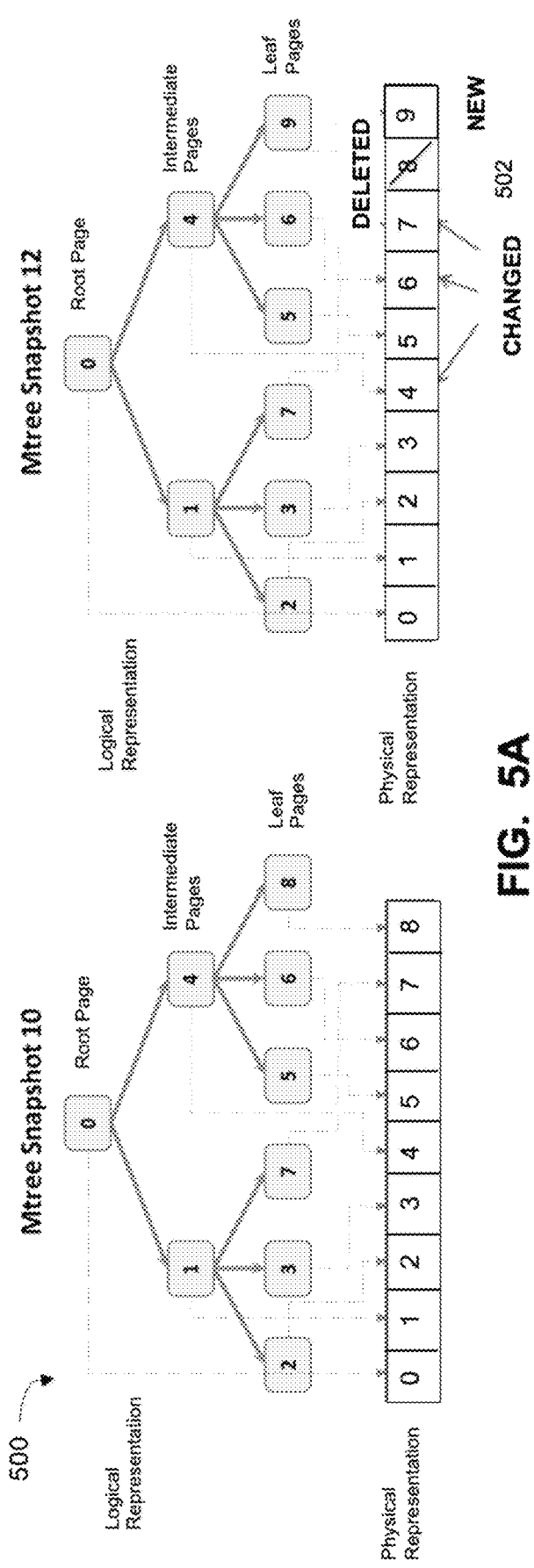
FIG. 5A illustrates an example of differencing (diffing) between two snapshots, under an example embodiment.
FIG. 5B illustrates a difference of two snapshots on a per-page basis.

In any filesystem, snapshots are point-in-time images of the namespace. FIGS. 5A and 5B illustrate an MTree differencing operation performed on two MTree snapshots. As shown in diagram 500 of FIG. 5A, an MTree Snapshot 10 is taken at a first moment in time showing the corresponding logical and physical representations of the MTree at that time, and MTree Snapshot 12 is taken at a second moment in time showing the corresponding logical and physical representations of the MTree at that time with certain changes, deletions, and additions 502 made to the MTree.

FIG. 5B illustrates the physical representations of the MTree Snapshots 10 and 12 with the differences shown as highlighted specific data entries 510. The entries of the snapshots 511 are annotated by an appropriate snapshot ID number (SID). When a file is created or modified, its leaf page where its keys reside is updated with the currently highest snapshot ID that has been issued. This is helpful when diffing two snapshots since pages that haven't been updated since before the oldest of the two snapshots has been modified between the time of the two snapshots being compared, and can be ignored.

Snapshots are differenced by comparing the snapshot ID saved for each page. Once the individual pages have been identified they must then be compared individually, key-by-key. For purposes of the present description, however, once modified pages are found they are simply the subject of verification.

Cluster Filesystems

Distributed filesystems that operate in a cluster of compute nodes have proliferated over the last two decades. Cluster filesystems spread work over several nodes, but present a problem in that ability for a node to fail and restart while the system as a whole remains available. In this case, the ability to perform data verifications in parallel is a requirement.

Figure 6:
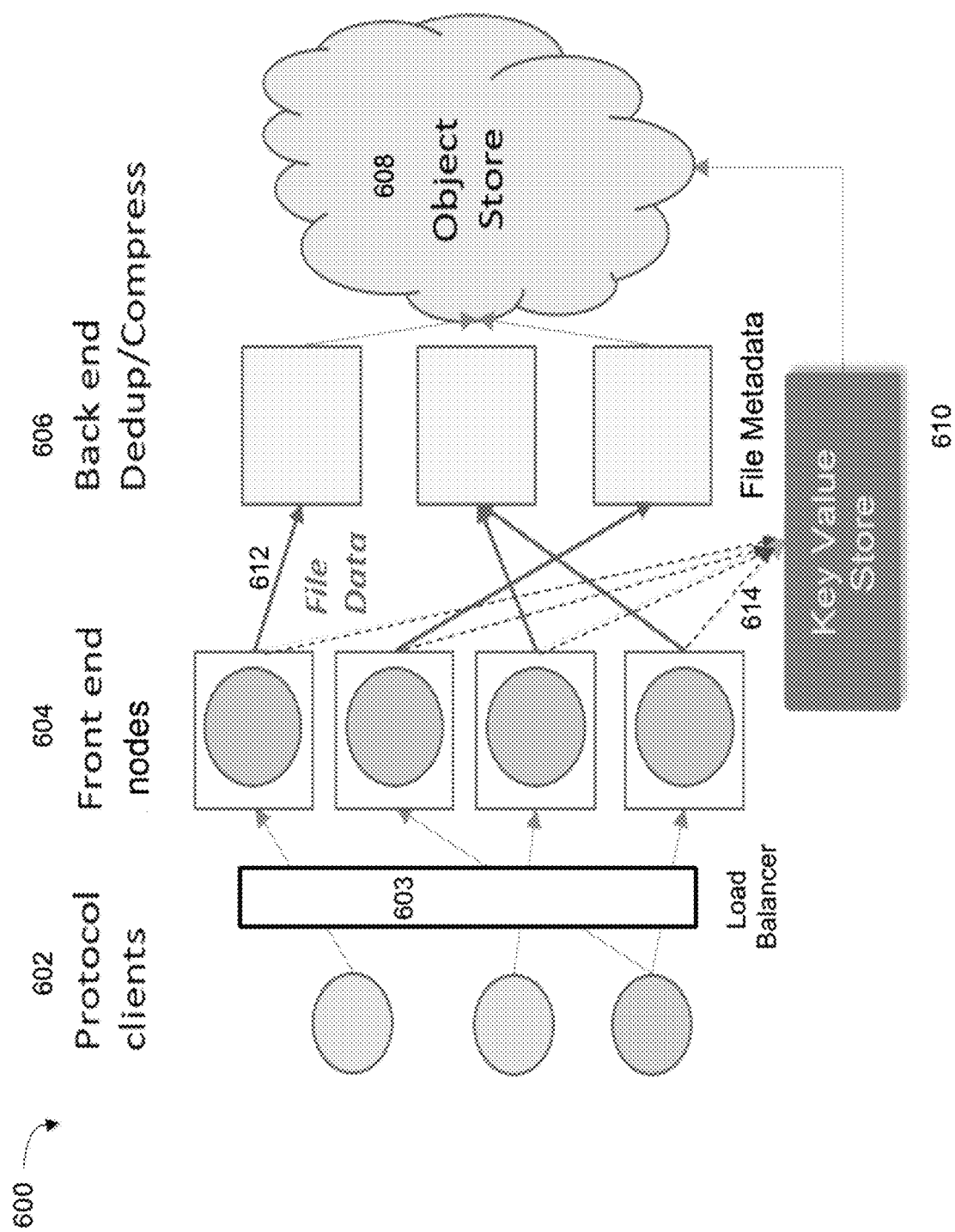
FIG. 6 illustrates a cluster filesystem network, under some embodiments.

Many cluster networks distinguish between file metadata and file data and offer some form of snapshot that provides a consistent point-in-time image between those objects. FIG. 6 illustrates a cluster filesystem network, under some embodiments. In an embodiment, the network 600 represents a cluster version of DDFS that follows a model processing file metadata 614 (represented as dashed lines) on the front-end nodes 604 and file data 612 (represented by solid lines) generated by protocol clients 602 on the back-end objects 606. A load balancer 603 selects which node 604 should field which client 602 data traffic.

In some cases of a cluster network, a node may represent an access point, which is a point of access to a filesystem operation, such as looking up files by name and returning a file handle (e.g., pid:cid ID), and then providing read and write access to that file's data. There may be data objects that store the actual file data, and a request goes through the access node to get the file's data which is stored on the data object.

It should be noted that FIG. 6 illustrates a cluster network comprises multiple nodes 604. A single-node network would simply comprise a single node and no load balancer component 603. Furthermore, for the single-node embodiment, a transaction log (described below) may be implemented as a log stored in NVRAM (non-volatile RAM), or similar memory. In a single-node system, a node may be a single computer unit, such as a rack server, a virtual machine, and so on.

In system 600, Mtree metadata 614 is persisted in a distributed key-value store (KVS) 610. A distributed lock manager is used to assure serialized access to critical data structures. Data, and metadata are both written to a transaction log, which provides high-speed non-volatile services akin to NVRAM for ongoing transactions.

In an embodiment, a continuous verification process involves accessing and/or intercepting writes to this facility for verification hints. The bulk of the namespace verification process in system 600 involves reading back metadata 614 that has been previously written to the KVS 610. It should be noted that much of the inode information may be stored separately from the B+ Tree, but from a verification viewpoint, the processing is essentially the same.

For each Mtree, two checksums are maintained for integrity checking purposes, the directory checksum, and the file checksum. FIG. 7A is a table 700 that illustrates namespace checksums for a cluster filesystem, under some embodiments. These checksums are stored with the active Mtree and its snapshots. In a cluster environment 600, these checksums are only in full consistency with the on-disk state of the Mtree when a cluster-wide synchronization has been performed, e.g., when a snapshot is created. In turn, these checksums are used to verify the integrity of the snapshot by walking the entire Mtree and calculating the expected value of the checksum and then comparing it with the actual checksums archived with the snapshot.

Filesystem verification is a necessary operation in a recovery or restart operation after any system crash. A typical sequence on a single-node logging filesystem after a crash and restart is to (1) replay the transaction log (write to persistent storage any pending transactions at the time of the crash), (2) open the filesystem for user access, and (3) start verification of the filesystem to run concurrently with user access.

One issue is that without robust startup checks the filesystem may crash again when the verification process discovers any corruptions caused by or resulting from the earlier crash. Given that a crash (or loss of power, etc.) presents the most likely source of corruption, priority should be given to verifying any components modified around the time of that event. Verification in a cluster filesystem is more complicated because access to the filesystem continues when one node crashes and restarts or is potentially replaced with a new node. Since both single-node and cluster filesystems perform a replay process, which coincidently holds the transactions leading up to the crash, leveraging that for preemptive verification can through process 115.

Figure 8:
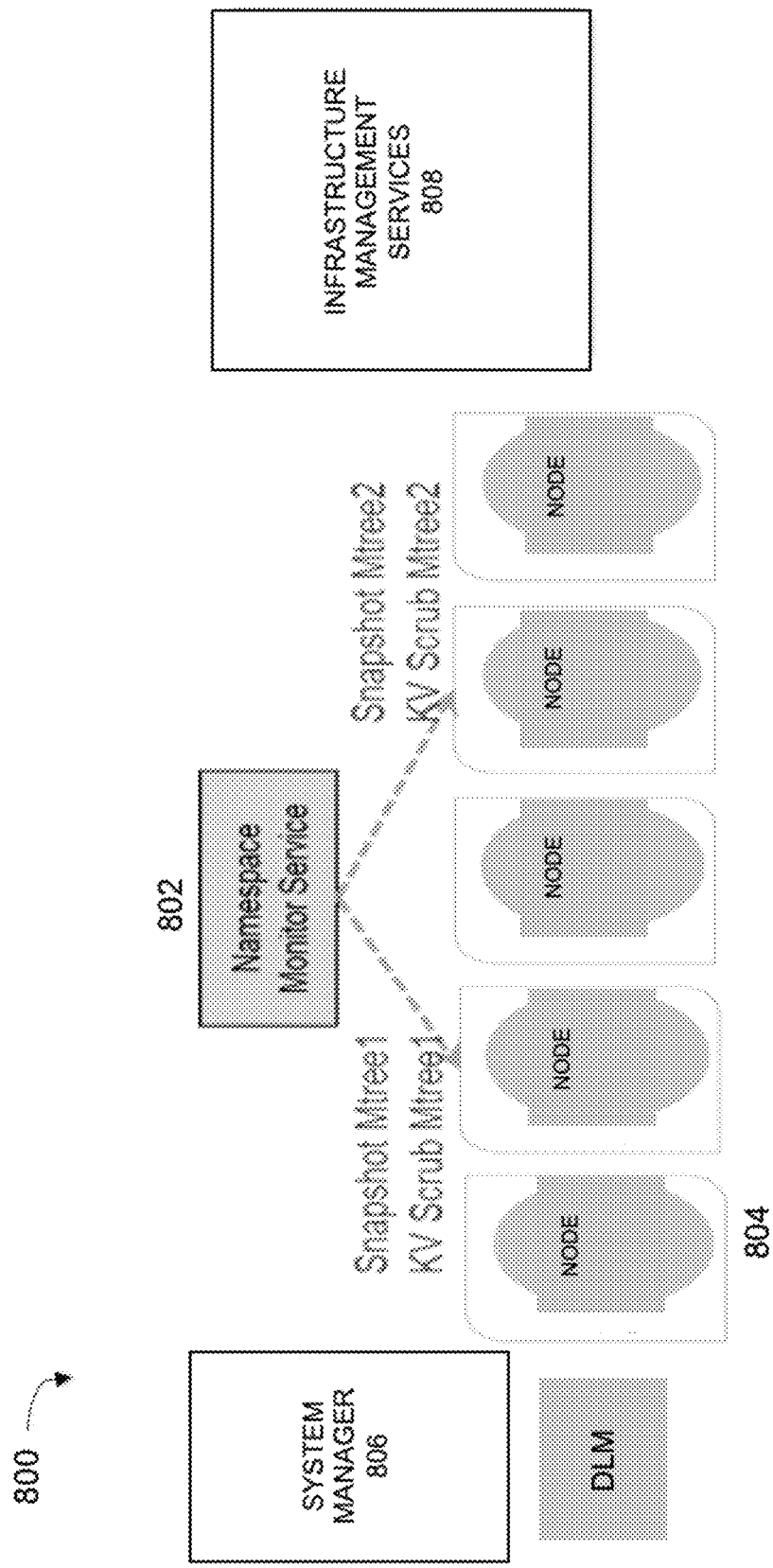
FIG. 8 illustrates a namespace monitor service, under some embodiments.

In cluster filesystem 600, verification activities are directed by a namespace monitor service. FIG. 8 illustrates a namespace monitor service 802, under some embodiments. Namespace verification for a given Mtree is run from an node, but for the embodiment of FIG. 8, system 800 spreads the operation over multiple nodes 804 as part of the adaptive verification module, as described in further detail below. Other components of system 800 may include a system manager 806 and an infrastructure management services component 808.

Adaptive Filesystem Verification

In an embodiment, the adaptive filesystem verification module and process 115 adaptively verifies namespace data as needed (e.g., after a system crash) in a manner that reduces the reliance on full verification runs, which visit the same metadata over and over again. It focuses instead on locating and checking the most recently modified filesystem structures by enabling a continuous verification method 122 for freshly written metadata, a differential technique 124 for metadata of moderate age, and a full verification method (also referred to as 'integral') 126 for older data. Three different verification methods are thus employed (continuous/differential/integral), and the selection and coordination between these methods is done dynamically. These verification processes can be performed on both single-node systems, and clusters systems where the work is distributed fractionally across the available resources.

The chief benefit of adaptive verification is that it can reduce error detection intervals from, for example, days to minutes on fresh metadata changes, while reducing overall computational costs. Use cases for this function include start-up verification after a filesystem crash, and runtime scrubbing of namespace metadata structures.

Continuous verification checks the metadata just written to the disk by monitoring the flow of transactions written to the non-volatile storage facility. Since it is functional at start-up, replayed log entries are subjected to verification as a sort of bread-crumb walk before bringing the filesystem fully online, thus filling gaps in some configurations. In a cluster filesystem (e.g., 600), this process executes in parallel verifying the metadata that each node has modified. Performance is maximized by caching and not persisting the results and subjecting the facility to quality-of-service (QoS) regulations. These relaxed policies can mean that under heavy load, it may run behind ingested data and that its state can be lost on a crash. The adaptive verification module employs several fall backs in such cases, such as initiating another differential verification run.

Differential verification 124 determines what to verify by comparing a current metadata snapshot with that of a prior integral or differential verification, and then verifying only the changed blocks. As differential verification proceeds it may take advantage of the continuous verification cache as an additional speed up.

The differential and continuous modes described here are relatively efficient, but under several circumstances, a full sweep of the filesystem is required, such as after garbage collection and to verify space accounting. Regular integral verifications 126 are configurable on both time and load considerations. Since snapshots are created for this process, they then become the base point for subsequent differential verification snapshots that verify only the changed pages.

For example, consider a one-petabyte size filesystem receiving a continuous ingest of new data at the rate of one gigabyte per second. In a day, the filesystem would grow by less than 10% of its total capacity. This means that a daily integral verification run would then be reverifying 90% of the same metadata while exposing a full day's worth of metadata to undetected corruption during the process of that verification. On the other hand, differential verification could be done hourly and still only use about 10% of the bandwidth that integral verification requires on a daily basis. This reduced and smoother and less burst-like workload is more amenable to quality-of-service regulatory mechanisms, and therefore less disruptive to normal user traffic versus once-per-day integral verification runs.

FIG. 7B is table 720 that lists the different verification methods used by the adaptive verification module for runtime verification, under some embodiments. Table 720 lists various parameters for each of the verification types of continuous, differential, and integral. In the table, the "lag" period is the amount of time that will typically pass between the time metadata modifications are written to persistent storage and the time it is read back for verification. Types that run with a "single-node" mode means that when run in a cluster, they execute from one node, assuming that it is operating off of shared storage also accessible by other nodes.

Figure 9:
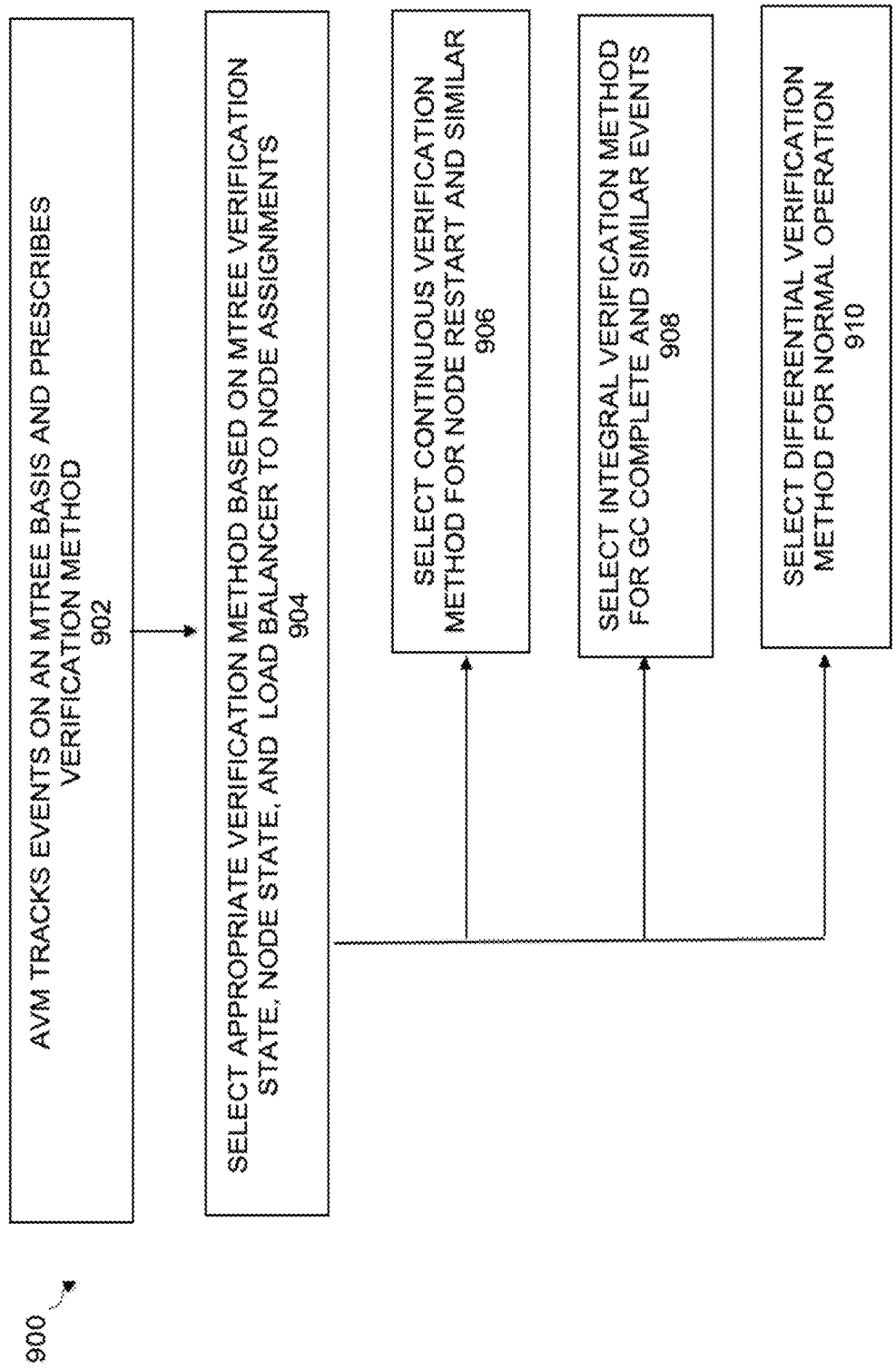
FIG. 9 is a flowchart illustrating an overall method of performing adaptive verification, under some embodiments.

FIG. 9 is a flowchart illustrating an overall method of performing adaptive verification, under some embodiments. As shown in FIG. 9, process 900 starts with step 902 in which the adaptive verification module (AVM) 115 tracks events on an Mtree basis and prescribes the use of at least one of continuous verification (CV) 122, differential verification (DV) 124, or integral verification (IV) 126, as required. This step is event-driven and draws its decision off of a set of tables that tracks the verification state of each Mtree, the state of the nodes, and the load balancer's Mtree to node assignments, 904. As shown in FIG. 9, the continuous verification method is selected for node restart conditions, or similar events, 906; integral verification is selected for garbage collection (GC) complete and similar events, 908; and differential verification is selected for normal operation, 910.

Figure 10:
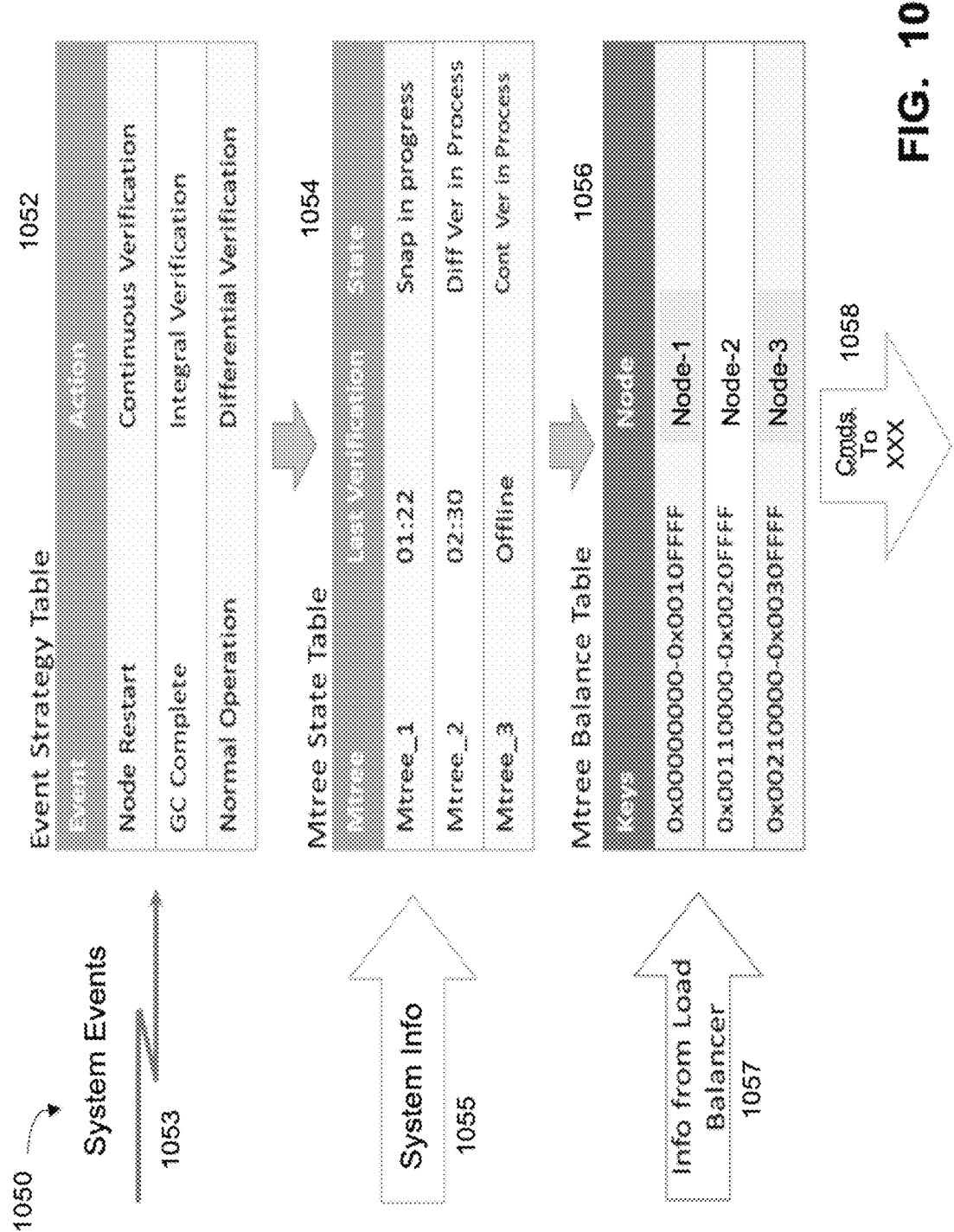
FIG. 10 illustrate tables that list different verification factors used by the AVM to select the verification method for run-time verification, under some embodiments.

FIG. 10 illustrates tables used by the AVM to select an appropriate verification method, under some embodiments. By tracking the events that can affect namespace integrity such as crashes, inbound load, and long-term aging the module can select the most appropriate verification strategy based on current circumstances. As shown in diagram 1050, certain node or cluster events 1053 are monitored and processed by an event strategy process/component. The event strategy table 1052 lists certain events that trigger a corresponding verification method that is seemed to be most appropriate for the event. As shown, a node restart event results in continuous verification 122, a GC completion results in integral verification 126, and normal operation uses differential verification 124.

The verification method then informs an Mtree state process that uses table 1054, which uses information from the nodes, 1055. Various different states at different times can be attributed to the Mtrees, such as snapshot in progress, differential verification in process, continuous verification in process, and so on.

Information from the load balancer 1057 and the current Mtree state from table 1054 are then used by an Mtree balance table 1056 process to send commands to the nodes, 1058.

Figure 11:
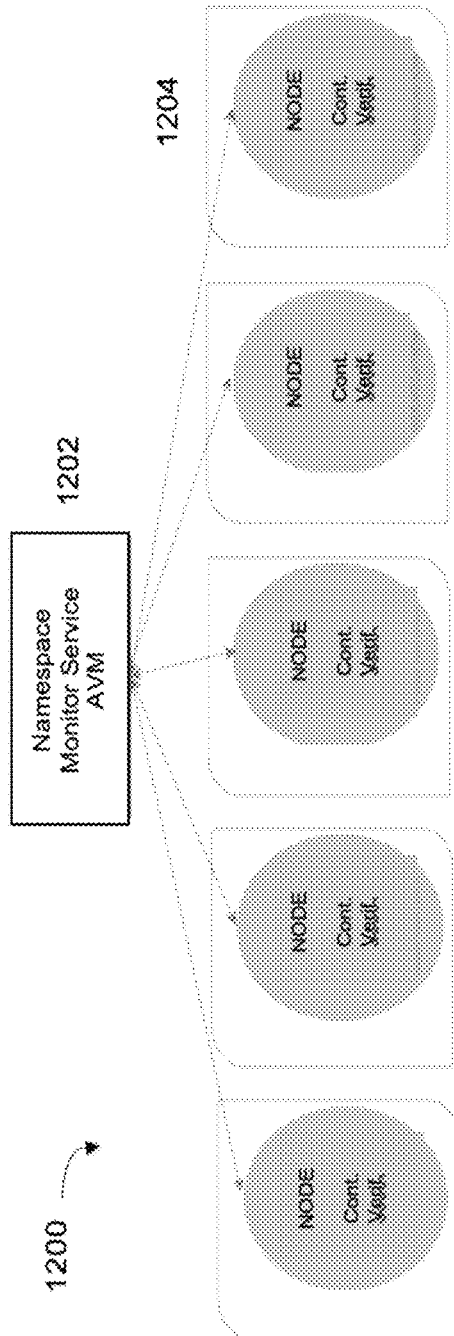
FIG. 11 is a table that illustrates certain policies based on certain example events and circumstances, under some embodiments.

Certain defined AVM policies can be used to select the appropriate verification strategy for each of the different verification methods, depending on current system performance characteristics and circumstances. FIG. 11 is a table 1100 that illustrates certain policies based on certain example events and circumstances, under some embodiments. As shown in FIG. 11, the events or characteristics can include items like low, high, or no ingest rates, node crashes, high error rates, and so on. The AVM can then apply an appropriate response, such as reducing or increasing differential verification intervals, throttling or accelerating continuous verification, and so on, as shown in the example table 1100. FIG. 11 is provided for purpose of example only, and other events and policies may also be defined and used.

Figure 12:
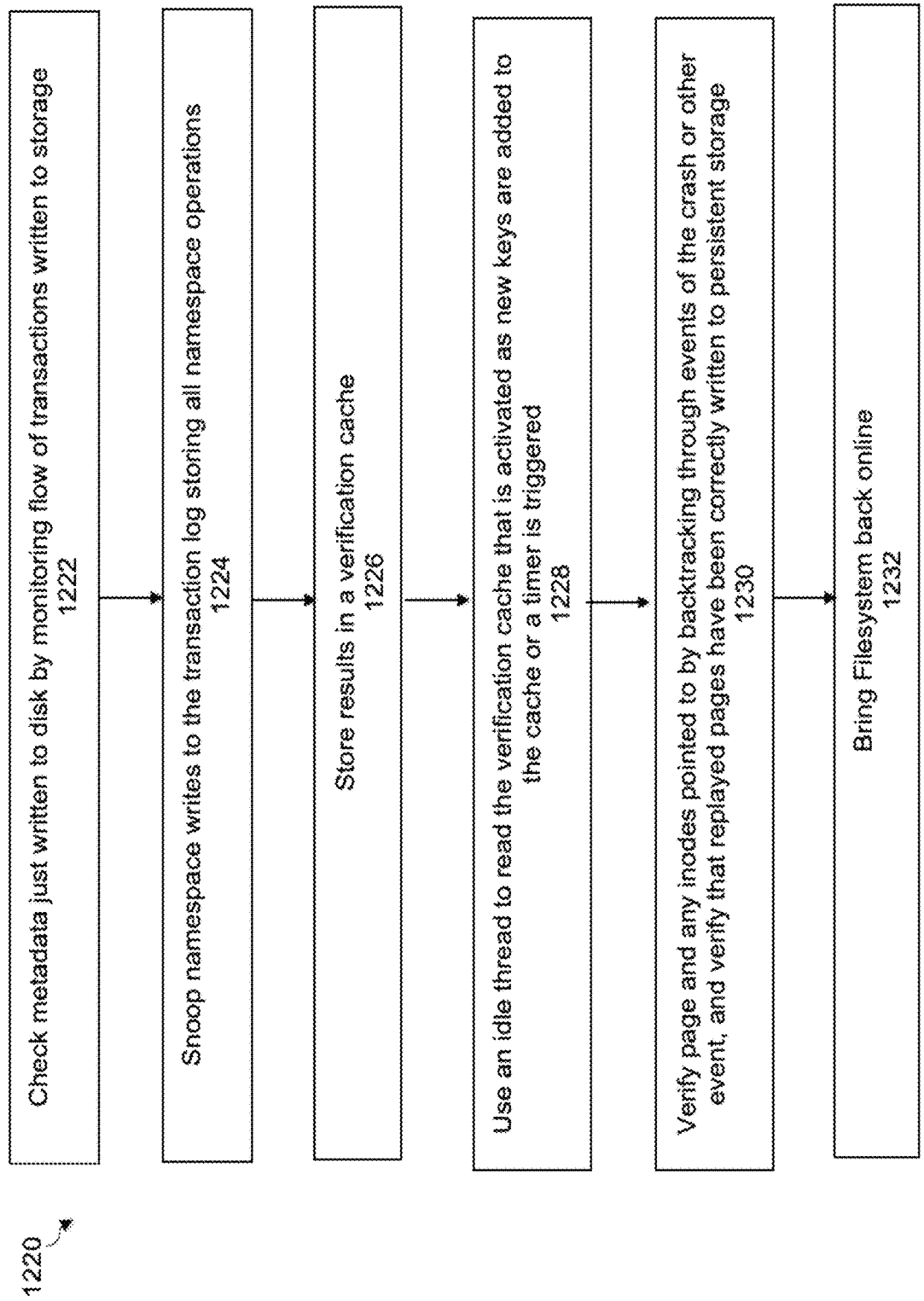
FIG. 12A is a diagram illustrating operation of continuous verification run on each node, under some embodiments.
FIG. 12B is a flowchart that illustrates an overall process of performing continuous verification, under some embodiments.

In an embodiment, continuous verification 122 runs independently on each node with minimal interaction with the AVM. FIG. 12A is a diagram 1200 illustrating operation of continuous verification run on each node, under some embodiments. As shown in FIG. 12A, the namespace monitor service 1202 containing the AVM performs the verification process on each node 1204 in parallel.

The continuous verification method 122 takes advantage of the fact that all namespace operations, such as file creates, updates and deletes, are logged in a transaction log, which like a traditional NVRAM devices is fast and retains its data through a power fail conditions. The continuous verification process snoops on namespace writes to the transaction log, parses that information, and deposits the writes in a verification cache. A verification thread reads that cache and performs verification of the page and any inodes it points to.

FIG. 12B is a flowchart that illustrates an overall process of performing continuous verification, under some embodiments. Such a process may be configured to operate automatically and continuously in the event of a system crash or other significant event. In such an event, the system is assumed to be powered down, and process 1220 proceeds upon system restart. In process 1220, metadata just written to the disk is checked by monitoring the flow of transactions written to non-volatile storage, 1222. In a single-node filesystem, this is performed for the node, while for a cluster filesystem, this process executes in parallel verifying the metadata that each node has modified. The process snoops namespace writes that are logged in the transaction log that stores all namespace operations (e.g., creates, updates, deletes), 1224. The results are stored in a verification (or verify) cache, 1226. The continuous verification process uses a thread that is idle when there is no work for it to consume and that is activated when new keys are added to the verification cache or when a set timer count has expired, 1228.

When the system is restarted and replay is performed, a list of modified pages is constructed. The actual verification comprises verifying these pages (and any inodes pointed thereto) by backtracking through events of the crash (or other event) and verify that the replayed pages have been correctly written to persistent storage, 1230. The filesystem can then be brought back online, 1232.

With respect to the verification that the replayed pages have been correctly written, for each key and its payload in a B tree leaf page, a checksum is calculated. There is also a checksum for all the keys in the page, and there is a header to the page that also has its own checksum. A page is verified by reading the key and its payload and checking its checksum, while accumulating a checksum for all the keys. Once all the keys are read, that all-keys checksum is compared with what has been saved. The header, which contains the number of active keys in the page and other stats, is then scanned and a checksum is calculated, and that checksum is compared with the stored header checksum. In all cases these calculations do not include the checksum itself. For example when the header is scanned to calculate its checksum it's header-checksum field is not included in that calculation. This completes the page verification operation in step 1230. A similar verification operation can be performed on directories, if appropriate or necessary.

The continuous verification process 1220 thus uses a transaction log, an idle thread, a verification cache, and bread-crumb trail walking during shut-down and startup through transaction log verification.

Figure 13:
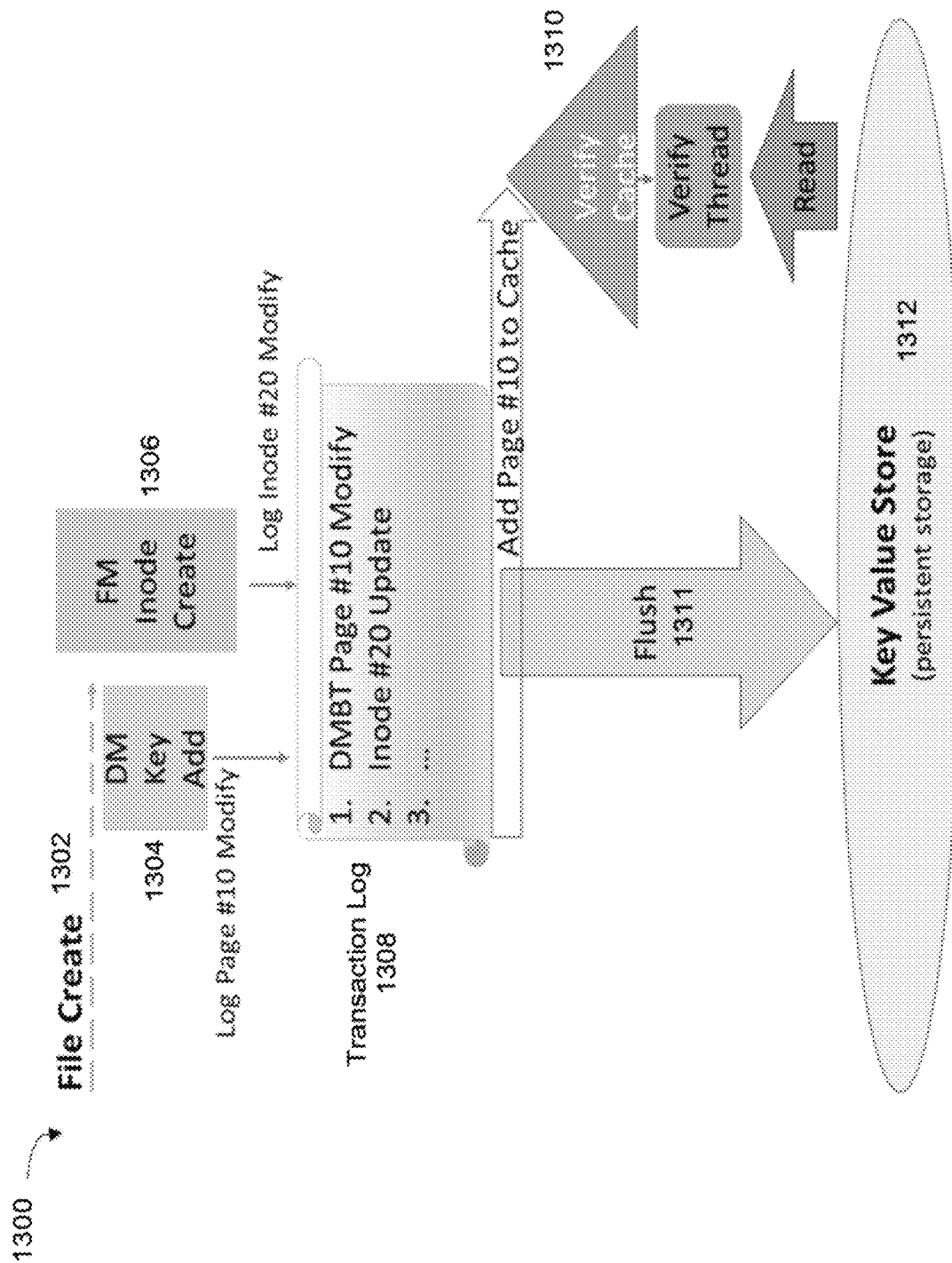
FIG. 13 illustrates a data flow for a continuous verification method, under some embodiments.

FIG. 13 illustrates data elements and a data flow for a continuous verification method, under some embodiments. As shown in diagram 1300, when a file is created 1302, such as when the filesystem is restarted and replay is performed, a list of modified pages is constructed. FIG. 13 illustrates an example of a directory management (DM) key add 1302 and a file management (FM) inode create 1306, which are then stored in a transaction log 1308. These pages, and their relatives, are subject to immediate verification before bringing the filesystem online. This is bread-crumb verification where the process backtracks through the events of a possible crash and ensures that the replayed commands had been correctly written to persistent storage.

The transaction log 1308 is always persistent so as to withstand any system crashes. It is embodied as a transaction log (aka intent log), which is a standard mechanism to capture metadata changes in a persistent log. When there is a filesystem crash, metadata could be in various states of incompleteness. The transaction log is used to restore the metadata to a consistent state. As shown in diagram 1300, it stores a list of metadata changes consisting of modified DMBT page and modified file inodes.

The transaction log 1308 entries are translated into the DMBT page identifiers that are affected by the change. The page information is condensed into a stream of identifiers and stored in a verification (or 'verify') cache 1310 in batches on each flush operation 1311 of the transaction log. In an embodiment, the transaction log 1308 may be implemented as a persistent transaction log comprising a circular buffer data structure having a fixed size.

The continuous verification cache 1310 is another B+ Tree with no backing store and holds a condensed cache of metadata modifications, also with a key/value orientation, as provided by key value (KV) store 1312. In an embodiment, the verification cache 1310 is implemented as small, volatile memory The keys in this case are simply unique identifiers of the Mtree B+ Tree pages (DMBT pages) and inode objects. These keys can be provided in a format, such as: <mid><sid><page_no>, and <pid><cid><sid> respectively. Information regarding the files modified and their connection to directories and specific to the verification process is saved in the value portion of the key-value structures in KV store 1312.

In an embodiment, the verification cache is implemented in the form <mid:sid:pageno>:<verification_state>, where mid is the Mtree ID, SID is the snapshot ID, and 'pageno' is the B+ tree page number. The verification state would be: unverified|verified|in-progress. The cache would be populated by the continuous verification process and then used by differential verification to speed up its performance. When differential verification runs, a snapshot is created and compared with the earlier snapshot. Pages that have changed (via the differential verification process) are looked up in the verification cache, and if a page is present in the cache and has a snapshot ID number lower than the snapshot the was created, then it has already been verified and does need to be checked. Otherwise the page is subject to page verification.

Figure 14:
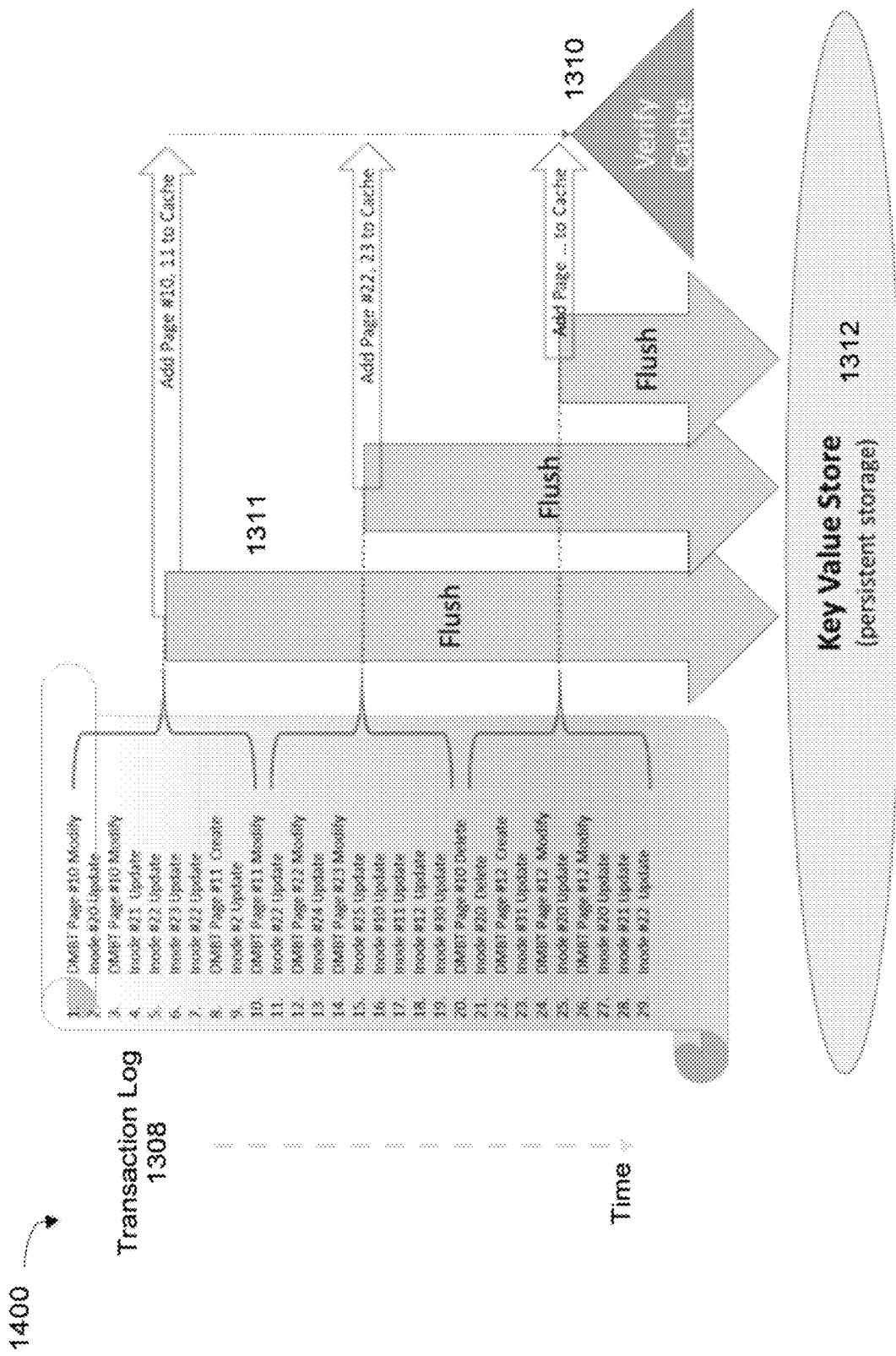
FIG. 14 illustrates a CV transaction log snooping process for the system of FIG. 13, under an example embodiment.

As stated above, the continuous verification process snoops on namespace writes to the transaction log 1308, parses that information, and deposits the writes in verification cache 1310. FIG. 14 illustrates a CV transaction log snooping process, for the system of FIG. 13, under an example embodiment. As shown in the example of FIG. 14, system 1400 includes transaction log 1308 populated over time with the different modified pages and inodes. During various flush operations 1311 to the KV store 1312, certain modified page/inode information is stored in the verification cache 1310.

If a DMBT page has been fully verified, the cache payload for that page contains information suitable for the differential verification process to reconstruct the global checksum without rescanning the actual page in question. Repeated updates of the same page result in updates to the value portion, including a time-modified field, which is used for page verification aging.

In an embodiment, the continuous verification process is performed by a thread that is idle when there is no work for it to consume. As new keys are added to the verification cache, a timer is set that will awaken the verification thread after a specified settling time has expired. Since the page info stored in the verification cache contains its time of last modification, only pages beyond a certain age are subject to verification. This allows many per-page namespace modification operations to coalesce into a single verify operation.

File inodes can also be verified in this same way. The caching of verification status on an individual node is subject to a couple cache invalidate operations, such as when another node starts modifying the same object. In a cluster filesystem, a number of features such as the load balancer work to minimize "ping-ponging" of this type. The information on the pages and inodes that have been verified is exported to the adaptive verification module and is used as a cache of pre-validated objects for the differential verification operation.

Locking and cache coherence go hand in hand in this design along established lines. Addition and removal of entries are mutex protected. Entries being verified are write locked in the verify-cache and read-locked in the main DMBT cache. In a cluster filesystem there is distributed lock manager and can revoke access to a DMBT page, which will invalidate the corresponding page in the verification cache 1310.

As shown in FIGS. 1 and 9, another verification method comprises differential verification 124. In an embodiment, differential verification (DV) is run periodically at regular intervals, such as on the order of hours. The verification work is distributed across the available nodes approximately following the same client-to-node assignments made by the load balancer as described for continuous verification. Differential verification operates by comparing a pair of snapshots, with one being from the prior differential verification or integral verification run, and the other being a more current run, created possibly for verification only. This means that the snapshot ID (SID) for the last checked/verified snapshot ID must be maintained in persistent storage. For example, assume that sid2 is the last verified snapshot of the namespace. The next subsequent check only needs to check the metadata changes between the time of s2 to s3; that is, only the fractional changes between s2 and s3 need to be verified.

In an embodiment, the differential verification process can be optimized by skipping verification of pages that have already been verified by continuous verification. This optimization is accomplished by checking the local verification cache that is present on that nodes. The nodes will validate (remove) the verification cache entries for the pages/inodes that have been verified.

Figure 15:
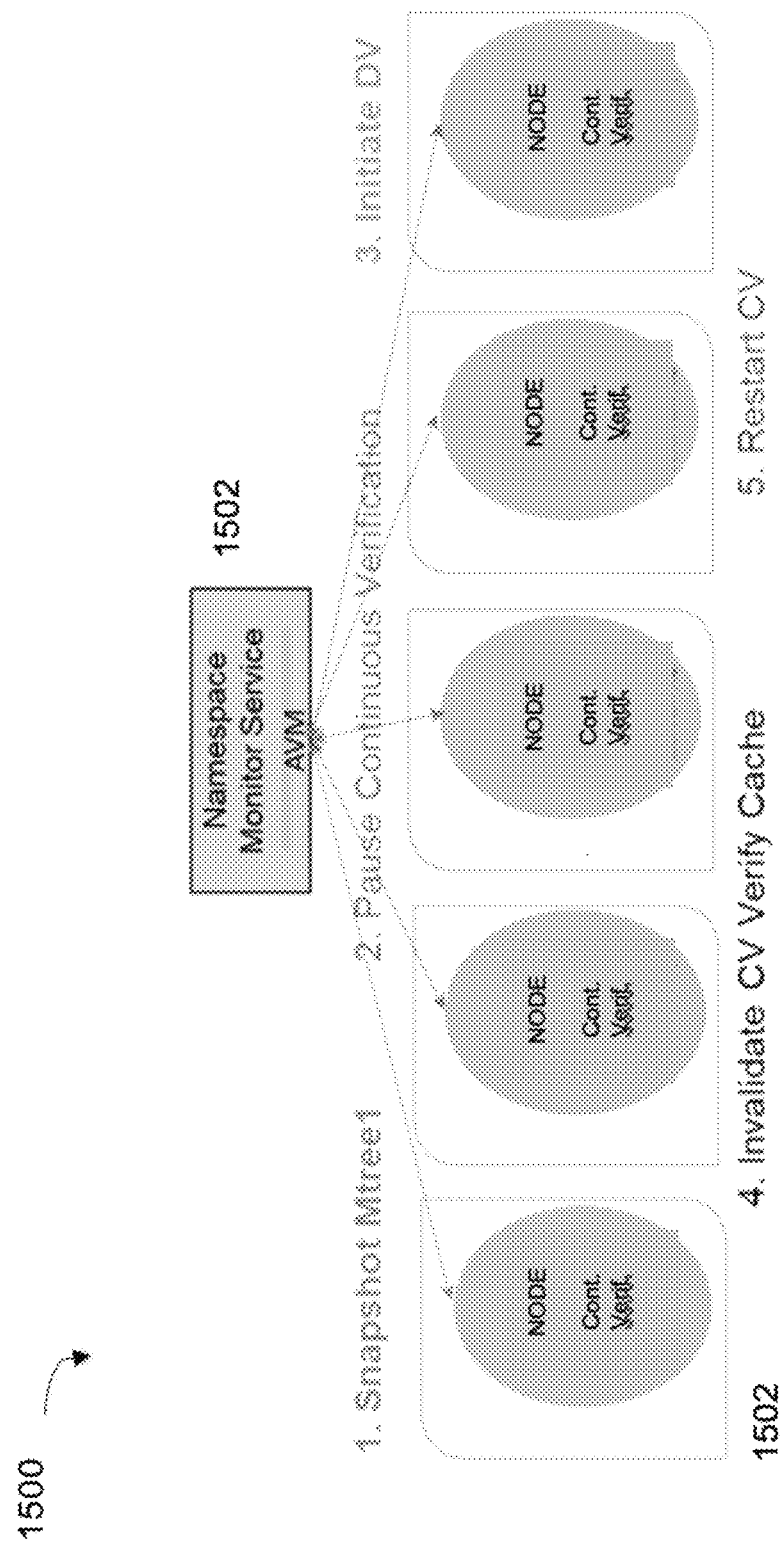
FIG. 15 illustrates an interaction of differential verification and continuous verification, under some embodiments.

FIG. 15 illustrates an interaction of differential verification and continuous verification, under some embodiments. As shown in diagram 1500 of FIG. 15, the AVM of the namespace monitor service 1502 initiates a continuous verification process on each node 1504. The process then snapshots the Mtree in Node1 (step 1), and pauses the continuous verification in all of the nodes (step 2). It then initiates the differential verification operation (step 3), invalidates the CV verification cache (step 4), and restarts continuous verification in all nodes (step 5).

With respect to global checksum verification, each Mtree has a global checksum that includes the total count of files, and XOR or the CH (disk location info) and XOR of file ID (i.e., inode number). This is a weak checksum but is composable, which means items can be added and others removed. Since differential verification uses a snapshot differencing mechanism, such as shown in FIG. 5B, both items removed and those added between snapshots can be used to create a new expected checksum, which can then be compared with the checksum found in that snapshot, and it should match. For the cached pre-verified differential verification caches fetched from the continuous verification modules, they contain the relevant data needed for the proper computation of the global checksum, without looking at the actual page in question.

As further shown in FIGS. 1 and 9, yet another verification method comprises integral verification 126. Integral verification (IV) performs a full walk of a directory counting all the files and verifies that the directory inode contains a matching count, Differential verification can produce a similar calculation using snapshot differencing akin to the checksum method described above. File inodes contain a reference to their original directory (the one they were created in) and this information is also checked in both integral and differential verification. Integral verification is generally required to verify the oldest system data. It is also useful to detect snapshot delete mistakes that might cause missing pages, particularly in the shared page scheme that a cluster filesystem may use. It operates much the same as traditional full verification by taking an entire sweep of a fileset's (e.g. Mtree) metadata, and generally does not utilize the verification cache 1310.

In an embodiment, page verification is performed by all the above verification types: integral, differential and continuous. Page verification can be performed by the following process:
 (1) Verify that that header is properly formatted and that all the flags are in legal combinations.
 (2) Verify that the header count of "live" keys is equal to the number of live keys in the page.
 (3) For each key, verify that its data (the payload or value associated with the key) matches the checksum for that data.
 (4) Verify that the checksum for the key itself matches the contents of the key
 (5) Verify that the space used by the keys and the data matches the space recorded in the page header.
 (6) Verify that the deleted space in the page matches the header's count of deleted space.
 (7) Verify that the keys in the page are increasing properly.
 (8) Verify that empty pages have zero keys.
 (9) If the page is also present in a separate SSD cache, verify that they are identical.

Full namespace verification is done for integral and differential verification. In an embodiment, namespace verification can be performed by the following process:
 (1) Walk the keys starting with the lowest first.
 (2) If it is a key type CHILD (or CHILD_INDIRECT) then it is the key for the inode, or main data structure for a file.
  (a) Fetch all its "links." These are DIRENTs that contain a name for a file (a file can have more than one name) by looking at its BLINK (back link) keys, which point to its DIRENT keys that point back to the file.
  (b) Verify the "nlinks" field of the inode (i.e., that the number of dirents equals nlinks).
  (c) Verify the hash_sum field of the inode (i.e., that the sum of the hashes of all the names adds up).
  (c) If the CHILD key is a directory inode, walk all its subordinates:

(i) Count all its subordinate CHILD entries and verify that they match the expected number of entries. Add up their file-IDs (the cid part of the pid:cid in their key) and verify that the sum matches the expected total.

(ii) Count the sizes of all its subordinate DIRENT entries and check that the hashes and sizes (the size of the name of the file) sum up as expected.

(3) if the key type is a CI or CS_HASH, verify that it points to a valid DIRENT entry.

(4) If the key is a DIRENT, make sure it points to a valid CHILD entry.

(5) If the key is a BLINK, make sure it points to a valid DIRENT (as above).

It should be noted that there are several other key types, but these are singletons (i.e., they do not hook together like the above). In this case, verification involves add up all the size of all their payloads and make sur the total matches what is recorded in the header.

The Master file checksum is done by differential and integral verification, but not continuous verification.

Figure 16:
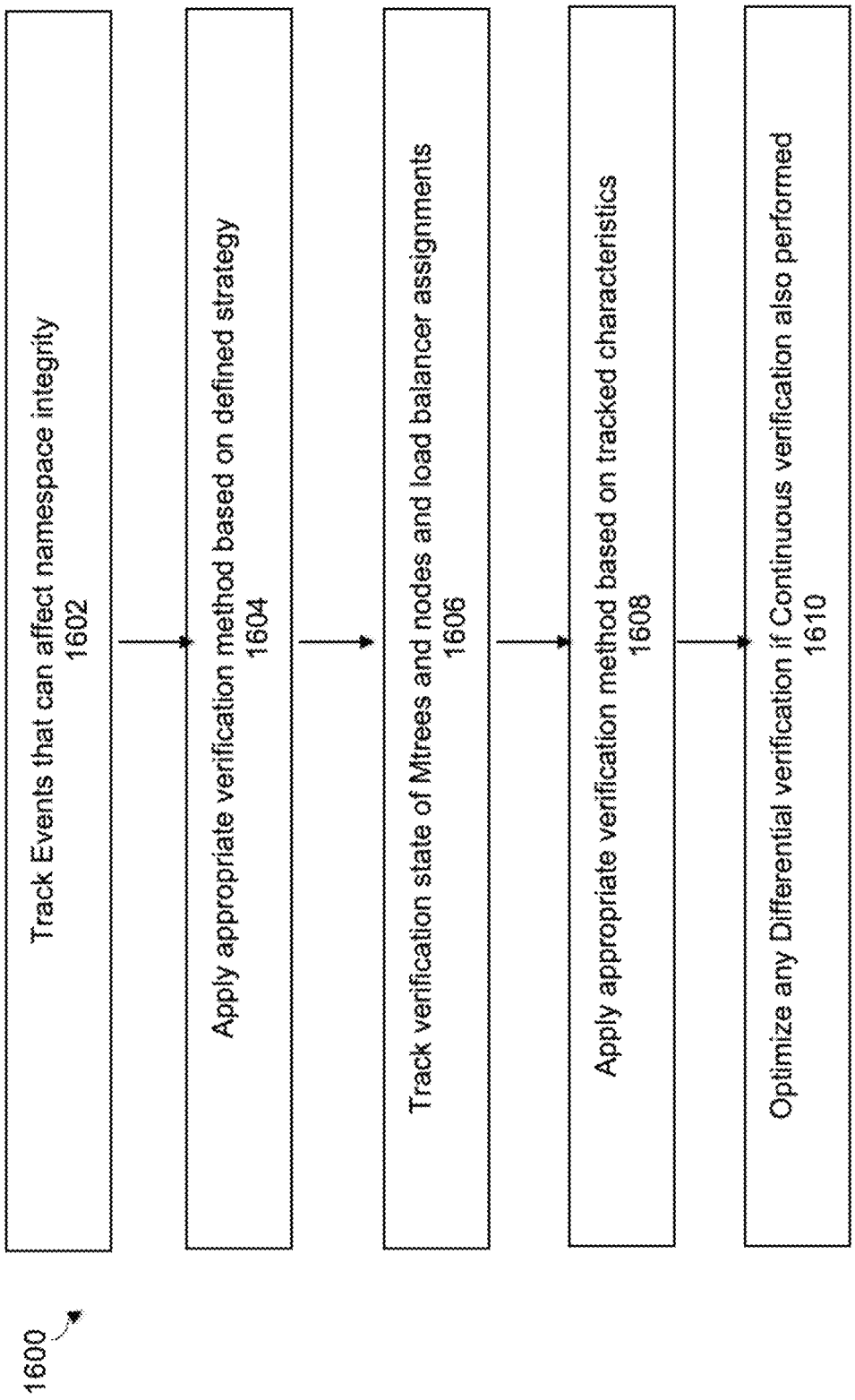
FIG. 16 is a flowchart that illustrates an overall process of performing adaptive verification, under some embodiments.

FIG. 16 is a flowchart that illustrates an overall process of performing adaptive verification, under some embodiments. In general, adaptive verification tracks system conditions and selects the most appropriate verification strategy from among any or all of differential, integral, and continuous verification. As shown in FIG. 16, process 1600 begins with tracking events that can affect namespace integrity, such as crashes, long-term aging, overload conditions, and so on, 1602. For certain events, an appropriate verification method (continuous, differential, integral) can be applied based on a defined strategy, 1604, such as defined in an event strategy table 1052. The system also tracks the verification state of Mtrees and nodes, as well as load balancer Mtree to node assignments. Based on these tracked characteristics, the process applies the appropriate verification method based on any single or combination of continuous, differential, or integral verification. A differential verification process can be optimized by skipping verification of pages that have already been verified by continuous verification, 1610.

Each verification method 122, 124, 126, provides overlap with one or more of the other verification methods and adds resiliency in the case of system failures. Since continuous verification runs promptly on node restart, it can detect corruptions from a replay due to an earlier crash and provides coverage even if the differential verification and integral verification operations, which are externally directed, are delayed. Differential verification provides coverage if continuous verification falls behind, or if there is a skew between nodes, since differential verification is a global operation. The directory manager makes uses of continuous verification data to reduce its workload, but if CV data is unavailable it will simply verify pages that it otherwise would have skipped resulting at worst a redundant verify of the same page. Since integral verification verifies the entire Mtree any data that the others might have skipped will get verified by IV processing. Since integral verification also creates a snapshot, it can be used by differential verification as the start point for subsequent differential verification. Both integral and continuous verification events initiate requests to the nodes to purge their verification caches, which if missed, simply result again in a redundant verify of a namespace page.

Embodiments thus described provide a method of adaptive verification of filesystem data in both single-node and cluster filesystems, such as may be needed in the event of a system crash or other significant event. Embodiments provide adaptive verification strategies driven by a rules-driven knowledge base, a continuous verification method that feeds off a transaction log, and bread-crumb trail walking during startup and shut-down operations via transaction log driven verification. They also provide differential verification adapted for a cluster filesystems, differential verification acceleration via a verification cache produced by continuous verification, and integral verification that provides fallback support to continuous and differential verification.

Figure 17:
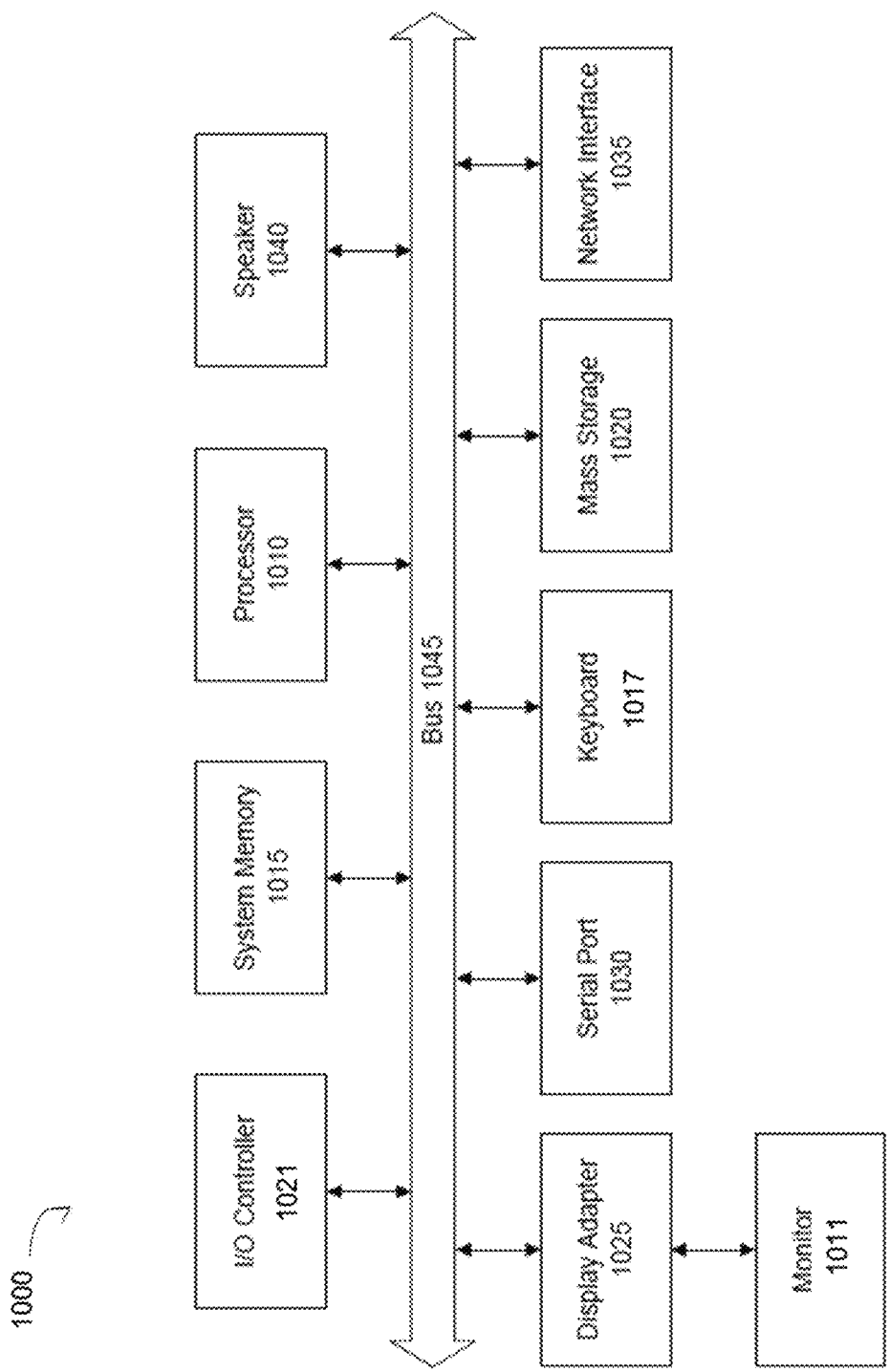
FIG. 17 is a block diagram of a computer system used to execute one or more software components of a namespace verification process, under some embodiments.

FIG. 17 is a block diagram of a computer system used to execute one or more software components of providing continuous and/or adaptive namespace verification for single or cluster filesystem, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 10 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of verifying filesystem data in a cluster filesystem using an adaptive verification process, comprising:
   maintaining metadata and file data wherein the metadata is processed using front-end nodes, and the file data is processed using back-end nodes;
   tracking cluster events on a directory tree basis for each node of the cluster filesystem;
   obtaining state information of the cluster filesystem about the front and back-end nodes;
   obtaining load balancer information about load balancer to node assignments, wherein the load balancer selects which node should field specific client data traffic; and
   dynamically determining an adaptive verification process selected from at least one of continuous verification, differential verification, and integral verification based on the tracked cluster events, the state information, and the load balancer information.

2. The method of claim 1 further comprising periodically executing a snapshot process that provides a consistent point-in-time image between the metadata and corresponding file data.

3. The method of claim 2 wherein the continuous verification comprises a verification process run independently on each node and utilizes namespace operations including file creates, updates, and deletes logged into a transaction log to continuously verify the filesystem data using a verification thread operating on a verification cache.

4. The method of claim 3 wherein the differential verification comprises a periodic process distributed among the nodes and comprises comparing snapshot copies of a current state and a previous verified state of the filesystem using the node assignments.

5. The method of claim 4 wherein the integral verification comprises taking an entire sweep of filesystem metadata by comparing periodic snapshots of the filesystem on a node-by-node basis.

6. The method of claim 1 wherein the cluster events comprise at least one of:
   a node restart for one or more nodes of the cluster, a garbage collection completion, and normal operation.

7. The method of claim 6 wherein continuous verification is used for the node restart cluster event, integral verification is used for a cluster event of the garbage collection completion, and differential verification is used for a cluster event of the normal operation.

8. The method of claim 7 further comprising tracking additional events in an adaptive namespace verification module (AVM), wherein the additional events comprise system crashes, inbound load conditions seen by the load balancer, and long-term aging of data.

9. The method of claim 8 further comprising implementing an AVM policy in response to one or more of the additional events, and wherein the AVM policies comprise adjusting verification process operational characteristics for the continuous verification, differential verification, and integral verification.

10. The method of claim 1 wherein the cluster filesystem comprises a network of individual nodes having a log-structured file system implemented in a Data Domain Filesystem, and wherein the namespace contains file metadata implemented as a B+ tree comprising a balanced tree of fixed depth, wherein a node is a page of space, and related metadata is stored in leaf pages.

11. A method of verifying filesystem data in a cluster filesystem using an adaptive verification process, comprising:
defining a rules driven knowledge base to implement a verification strategy based on defined cluster events and dynamic events;
periodically executing a snapshot process that provides a consistent point-in-time image between metadata and corresponding filesystem data; and
implementing at least one of continuous verification, differential verification, and integral verification based on the defined cluster events and system events, wherein the continuous verification comprises a verification process that utilizes namespace operations including file creates, updates, and deletes logged into a transaction log to continuously verify the filesystem data using a verification thread operating on a verification cache, the differential verification comprises a periodic process comparing snapshot copies of a current state and a previous verified state of cluster filesystem, and the integral verification comprises taking an entire sweep of filesystem metadata by comparing periodic snapshots of the filesystem on a node-by-node basis.

12. The method of claim 11 wherein the defined cluster events comprise at least one of: a node restart, a garbage collection completion, and normal operation, and wherein continuous verification is used for a cluster event of the node restart, integral verification is used for a cluster event of the garbage collection completion, and differential verification is used for a cluster event of the normal operation.

13. The method of claim 12 wherein the dynamic events comprise system crashes, inbound load conditions seen by a load balancer, and long-term aging of data.

14. The method of claim 13 further comprising implementing a policy in response to one or more of the dynamic events, and wherein policies comprise adjusting verification process operational characteristics for the continuous verification, differential verification, and integral verification.

15. The method of claim 11 wherein the cluster filesystem comprises a network of individual nodes having a log-structured file system implemented in a Data Domain Filesystem, wherein the namespace contains file metadata implemented as a B+ tree comprising a balanced tree of fixed depth, wherein a node is a page of space, and related metadata is stored in leaf pages, wherein the cluster filesystem separately maintains the metadata and file data, and wherein the metadata is processed using front-end nodes, and the file data is processed using back-end nodes.

16. A method of verifying filesystem data in a cluster filesystem using an adaptive verification process, comprising:
defining a rules driven knowledge base to implement a verification strategy based on defined cluster events and dynamic events;
periodically executing a snapshot process that provides a consistent point-in-time image between metadata and corresponding filesystem data; and
implementing at least one of continuous verification, differential verification, and integral verification based on the defined cluster events and system events, wherein the defined cluster events comprise at least one of: a node restart, a garbage collection completion, and normal operation, and wherein the dynamic events comprise system crashes, inbound load conditions seen by a load balancer, and long-term aging of data.

17. The method of claim 16 wherein continuous verification is used for a cluster event of the node restart, integral verification is used for a cluster event of the garbage collection completion, and differential verification is used for a cluster event of the normal operation.

18. The method of claim 17 further comprising implementing a policy in response to one or more of the dynamic events, and wherein policies comprise adjusting verification process operational characteristics for the continuous verification, differential verification, and integral verification.

19. The method of claim 18 wherein: the continuous verification comprises a verification process utilizes namespace operations including file creates, updates, and deletes logged into a transaction log to continuously verify the filesystem data using a verification thread operating on a verification cache, the differential verification comprises a periodic process comparing snapshot copies of a current state and a previous verified state of the filesystem, and the integral verification comprises taking an entire sweep of filesystem metadata by comparing periodic snapshots of the cluster filesystem on a node-by-node basis.

20. The method of claim 16 wherein the cluster filesystem comprises a network of individual nodes having a log-structured file system implemented in a Data Domain Filesystem, and wherein the namespace contains file metadata implemented as a B+tree comprising a balanced tree of fixed depth, wherein a node is a page of space, and related metadata is stored in leaf pages, wherein the cluster filesystem separately maintains the metadata and file data, wherein the metadata is processed using front-end nodes, and the file data is processed using back-end nodes.

* * * * *